United States Patent
Jang

(10) Patent No.: US 9,583,994 B2
(45) Date of Patent: Feb. 28, 2017

(54) MOTOR WITH SHAFT INTEGRATED SENSING MAGNET

(71) Applicant: LG INNOTEK CO., LTD., Seoul (KR)

(72) Inventor: Yoon Hae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 265 days.

(21) Appl. No.: 13/923,819

(22) Filed: Jun. 21, 2013

(65) Prior Publication Data

US 2013/0342086 A1   Dec. 26, 2013

(30) Foreign Application Priority Data

Jun. 22, 2012 (KR) .................. 10-2012-0067329

(51) Int. Cl.
  *H02K 29/06* (2006.01)
  *H02K 29/08* (2006.01)
  *H02K 29/14* (2006.01)
  *H02K 11/00* (2016.01)
  *H02K 7/00* (2006.01)

(52) U.S. Cl.
  CPC ......... *H02K 11/0015* (2013.01); *H02K 11/21* (2016.01); *H02K 29/08* (2013.01); *H02K 7/003* (2013.01); *H02K 29/06* (2013.01); *H02K 29/14* (2013.01)

(58) Field of Classification Search
  CPC ........... H02K 11/0015; H02K 11/0021; H02K 29/08; H02K 29/06; H02K 7/003; H02K 11/00; H02K 23/66; H02K 11/21; H02K 29/14; H02K 11/23; H02K 11/20
  USPC ............... 310/68 B, 156.11, 156.08, 156.09; 324/207.23, 207.25, 173, 174; 702/145, 702/146, 147
  See application file for complete search history.

(56) References Cited

U.S. PATENT DOCUMENTS

| | | | | |
|---|---|---|---|---|
| 2,323,945 A | * | 7/1943 | Strauss | H02K 7/145 310/50 |
| 4,125,821 A | * | 11/1978 | Masuda | H01L 43/08 257/E43.004 |

(Continued)

FOREIGN PATENT DOCUMENTS

| | | |
|---|---|---|
| CN | 101120177 A | 2/2008 |
| CN | 102361370 A | 2/2012 |

(Continued)

OTHER PUBLICATIONS

KR2010086758 English Translation.*
Office Action dated Aug. 30, 2016 in Chinese Application No. 201310253174.4.

*Primary Examiner* — Joshua Benitez-Rosario
*Assistant Examiner* — Alexander Moraza
(74) *Attorney, Agent, or Firm* — Saliwanchik, Lloyd & Eisenschenk

(57) ABSTRACT

Disclosed is a motor, the motor according to an exemplary embodiment of the present disclosure including a rotation shaft having an alignment groove at a distal end of one side from a rotation center, a sensing magnet disposed at the distal end of one side of the rotation shaft by being mounted on the alignment groove of the rotation shaft, a rotor including a magnet coupled to a periphery of the rotation shaft, and a stator including a core wrapping an ambient of the rotor and wound with a coil.

10 Claims, 4 Drawing Sheets

(56) References Cited

U.S. PATENT DOCUMENTS

| | | | | |
|---|---|---|---|---|
| 2010/0001719 A1* | 1/2010 | Kikuchi | ............... | H02K 23/66 |
| | | | | 324/207.15 |
| 2011/0304234 A1* | 12/2011 | Ramon | ............... | H02K 5/1672 |
| | | | | 310/156.21 |
| 2013/0169272 A1* | 7/2013 | Eichler | ............... | A61B 5/062 |
| | | | | 324/253 |

FOREIGN PATENT DOCUMENTS

| | | | |
|---|---|---|---|
| CN | 102730523 A | | 10/2012 |
| KR | 20070009170 A | | 1/2007 |
| KR | 2010086758 A | * | 8/2010 |
| KR | 20100086758 A | * | 8/2010 |

* cited by examiner

MOTOR WITH SHAFT INTEGRATED SENSING MAGNET

CROSS-REFERENCE TO RELATED APPLICATION

This application claims the benefit under 35 U.S.C. §119 of Korean Application No. 10-2012-0067329, filed Jun. 22, 2012, which is hereby incorporated by reference in its entirety.

BACKGROUND OF THE DISCLOSE

Field of the Disclosure

The present disclosure relates to a motor configured to be used for a dual clutch transmission and the like.

Discussion of the Related Art

In general, a motor is an apparatus converting an electric energy to a rotary power.

The motor includes a rotation shaft, a rotor including a magnet formed on the rotation shaft, and a stator including a coil generating an electromagnetic force in response to a current generated from the coil arranged about the rotor.

Some of the motors where revolution and rotation speed act as important factors may be arranged at a distal end of a rotation shaft with a sensing magnet counting the revolution of the rotation shaft, and a sensing plate calculating an actual revolution of the rotation shaft and rotation speed by detecting a magnetic field generated from the sensing magnet may be arranged at a position opposite to the sensing magnet.

In general, in a case the sensing magnet is arranged at the distal end of the rotation shaft having a flat cross-section, a rotation center of the rotation shaft and a rotation center of the sensing magnet may be adjacently arranged using a jig, but it is difficult to match the rotation center of the rotation shaft and the rotation center of the sensing magnet, even if the jig is used, whereby the sensing magnet is eccentrically rotated from the distal end of the rotation shaft.

Another disadvantage is that the number of assembly processes increases because the sensing magnet is arranged at the distal end of the rotation shaft using the jig.

Particularly, in a case the sensing magnet is eccentrically rotated from the distal end of the rotation shaft, sensing errors on the revolution and rotation speed frequently occur due to difficulty in accurately detecting the magnetic field generated from the sensing magnet.

BRIEF SUMMARY

The present disclosure is directed to cope with the above-mentioned problems/disadvantages and it is an object of the present disclosure to provide a motor configured to accurately detect a revolution and a rotation speed of a motor by accurately matching a rotation center of a rotation shaft and a rotation center of a sensing magnet without a separate alignment process.

In one general aspect of the present disclosure, there is provided a motor, the motor comprising: a rotation shaft having an alignment groove at a distal end of one side from a rotation center; a sensing magnet disposed at the distal end of one side of the rotation shaft by being mounted on the alignment groove of the rotation shaft; a rotor including a magnet coupled to a periphery of the rotation shaft; and a stator including a core wrapping an ambient of the rotor and wound with a coil.

Preferably, but not necessarily, the sensing magnet may take a shape of a pillar, and a rotation center of the sensing magnet may match a rotation center of the rotation shaft.

Preferably, but not necessarily, the sensing magnet may take a shape of a cylinder.

Preferably, but not necessarily, the motor may further comprise an adhesive between the sensing magnet and the rotation shaft.

Preferably, but not necessarily, a height of the sensing magnet may be greater than a depth of the alignment groove, and the sensing magnet may be protruded from the distal end of the rotation shaft.

Preferably, but not necessarily, the depth of the alignment groove may be less than 0.3 mm.

Preferably, but not necessarily, the depth of the alignment groove may be greater than the height of the sensing magnet.

Preferably, but not necessarily, an upper surface of the sensing magnet may be arranged on a same planar surface as that of the distal end of one side of the rotation shaft.

In an advantageous effect, a motor according to an exemplary embodiment of the present disclosure can accurately match a rotation center of a sensing magnet and a rotation center of a rotation shaft by arranging the sensing magnet arranged at a distal end of the rotation shaft for sensing a rotation speed of the rotation shaft, using an alignment groove formed at a distal end of the rotation shaft, to more accurately sense a revolution of the rotation shaft in response to the sensing magnet.

In another advantageous effect, a motor according to an exemplary embodiment of the present disclosure can shorten an entire assembly process by omitting a process using a separate jig.

DETAILED DESCRIPTION

Figure 1:
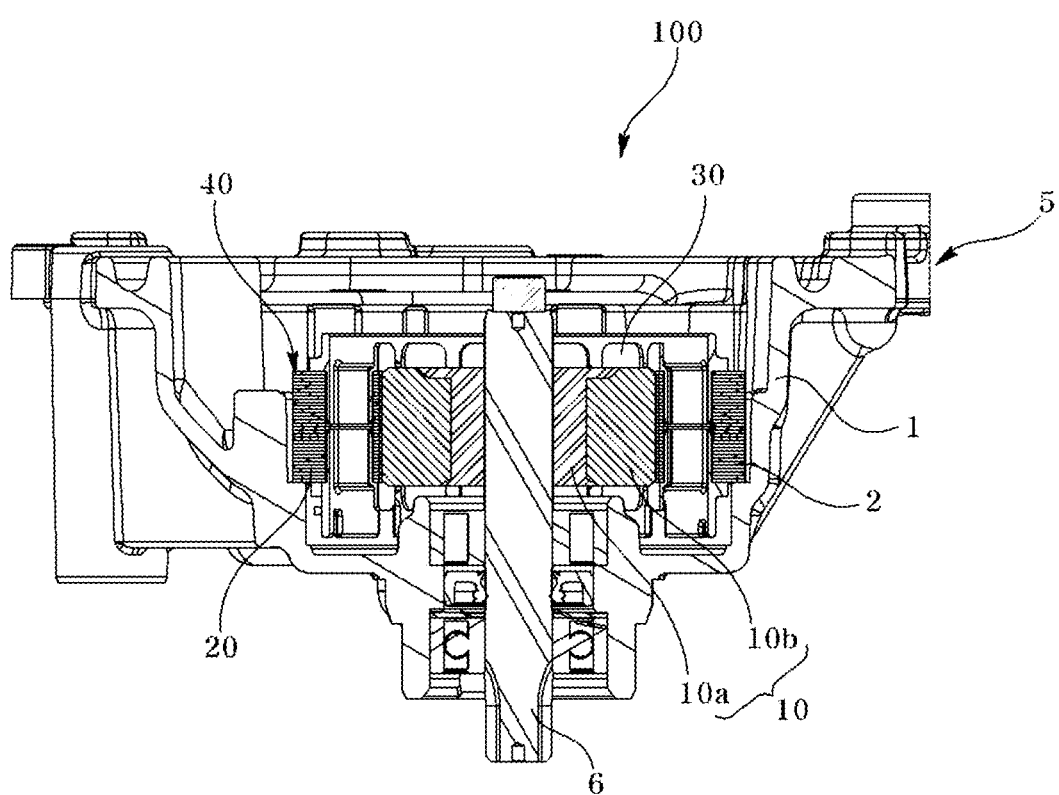
FIG. 1 is a cross-sectional view illustrating a motor according to an exemplary embodiment of the present disclosure.

Now, a motor according to exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. In the drawings, the size and relative sizes of layers, regions and/or other elements may be exaggerated or reduced for clarity. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 2:
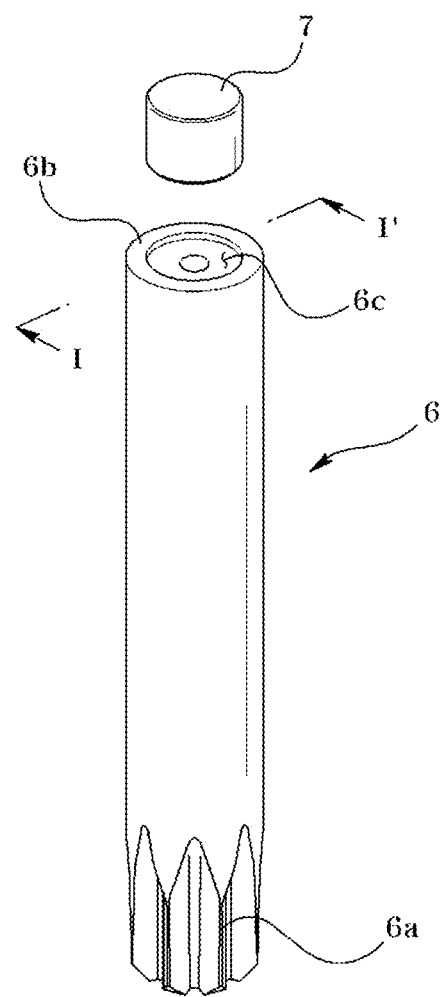
FIG. 2 is a perspective view illustrating a rotation shaft of FIG. 1.
Figure 3:
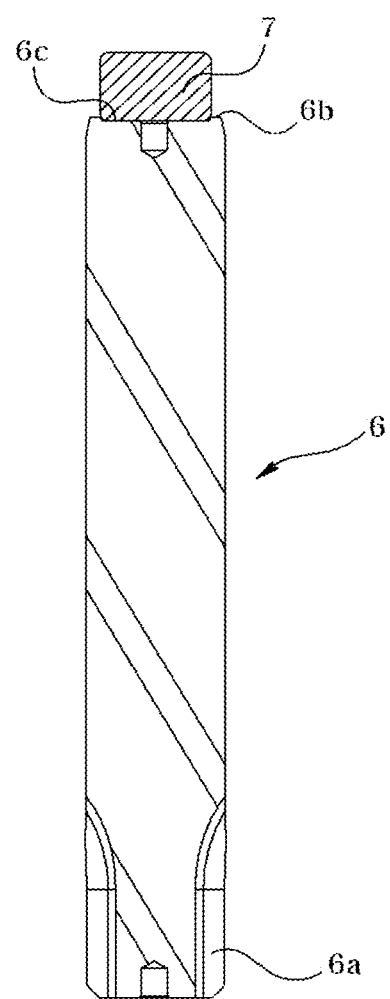
FIG. 3 is a cross-sectional view taken along line I-I' of FIG. 2.

FIG. 1 is a cross-sectional view illustrating a motor according to an exemplary embodiment of the present disclosure, FIG. 2 is a perspective view illustrating a rotation shaft of FIG. 1, and FIG. 3 is a cross-sectional view taken along line I-I' of FIG. 2.

Referring to FIGS. 1, 2 and 3, a motor (100) includes a rotation shaft (6), a sensing magnet (7), a rotor (10) and a stator (20). In addition, the motor (100) may further comprise a motor housing (5).

The motor housing (5) takes a shape of an upper surface-opened cylinder, and is fixed therein by the stator (20).

The shape of the motor housing (5) may be differently formed according to types of a used motor, and may be formed in a pair as illustrated in FIG. 1, in case of being employed for a motor used for a DCT (Dual-Clutch Transmission).

The DCTs uses two separate clutches for odd and even gear sets unlike a single clutch transmission mounted on a manual transmission vehicle.

In DCTs where the two clutches are arranged concentrically, the larger outer clutch drives the odd numbered (1, 3, 5) gears, whilst the smaller inner clutch drives the even (2, 4, 6) numbered gears by applying an engine's torque to one clutch.

The DCTs characteristically provide convenient operability and smooth shift quality as in an automatic transmission vehicle, and has higher fuel efficiency than that of a manual transmission vehicle.

The DCT includes a dual clutch formed with two clutches, a transmission control unit setting each shift by receiving a power from the dual clutch, a clutch actuator controlling each clutch of the dual clutch, a shift actuator performing the gear shift by applying selecting and shifting manipulations to the transmission control unit, and an electronic control unit electronically controlling the clutch actuator and the gear shift actuator by receiving various pieces of information including vehicle speed and gear shift command.

The rotation shaft (6) becomes a rotation center of the rotor (10).

The rotation shaft (6) takes a shape of a cylinder, and is formed at a bottom periphery of the rotation shaft (6) with a set of teeth (6a) for transmitting a power.

Referring to FIGS. 2 and 3, the rotation shaft (6) is formed at an upper surface (6b) with an alignment groove (6c) concavely formed from the upper surface (6b). The alignment groove (6c) may take a shape of a circle, when viewed from a top plan.

A diameter of the alignment groove (6c) is formed smaller than a diameter of the rotation shaft (6), and the alignment groove (6c) is formed with a depth of less than approximately 0.3 mm, when measured from the upper surface (6b) of the rotation shaft (6). A center of the alignment groove (6c) is formed same as a rotation center of the rotation shaft (6).

Although the exemplary embodiment of the present disclosure has described and explained that the depth of the alignment groove (6c) is less than approximately 0.3 mm, the depth of the alignment groove (6c) may be formed less than a height of a sensing magnet (7, described later).

The sensing magnet (7) is installed inside the alignment groove (6c) formed on the upper surface (6b) of the rotation shaft (6). A shape of the sensing magnet (7) corresponds to that of the alignment groove (6) to allow being inserted into the alignment groove (6c), and the sensing magnet (7) may be inserted or press-fitted into the alignment groove (6c).

In the exemplary embodiment of the present disclosure, the sensing magnet (7) may take a cylindrical shape, for example.

The sensing magnet (7) inserted or press-fitted into the alignment groove (6c) generates a magnetic field for sensing the revolution of the rotation shaft (6). An area opposite to the sensing magnet (7) inserted or press-fitted into the alignment groove (6c) is arranged with a sensing plate detecting the magnetic field generated from the sensing magnet (7).

In the exemplary embodiment of the present disclosure, a height of the sensing magnet (7) may be formed higher than the depth of the alignment groove (6c), whereby the sensing magnet (7) is protruded from the upper surface of the rotation shaft (6) at a predetermined height.

Meanwhile, an adhesive may be interposed between an inner surface of the rotation shall (6) formed by the alignment groove (6c) and the sensing magnet (7) in order to prevent the sensing magnet inserted or press-fitted into the alignment groove (6c) from being disengaged from the rotation shaft (6) when the rotation shaft (6) is rotated at a high speed.

In the exemplary embodiment of the present disclosure, the sensing magnet (7) can be coupled to the rotation shaft (6) without any separate jig, because the sensing magnet (7) is inserted or press-fitted into the alignment groove (6c) having a center that matches to a rotation center of the rotation shaft (6).

Hence, even a simple insertion or press-fitting of the sensing magnet (7) into the alignment groove (6c) of rotation shaft (6) can accurately match the rotation center of the sensing magnet (7) to the rotation center of the rotation shaft (6), whereby a sensing error of revolution of the rotation shaft (6) caused by an installation position of the sensing magnet (7) can be restricted or prevented.

Figure 4:
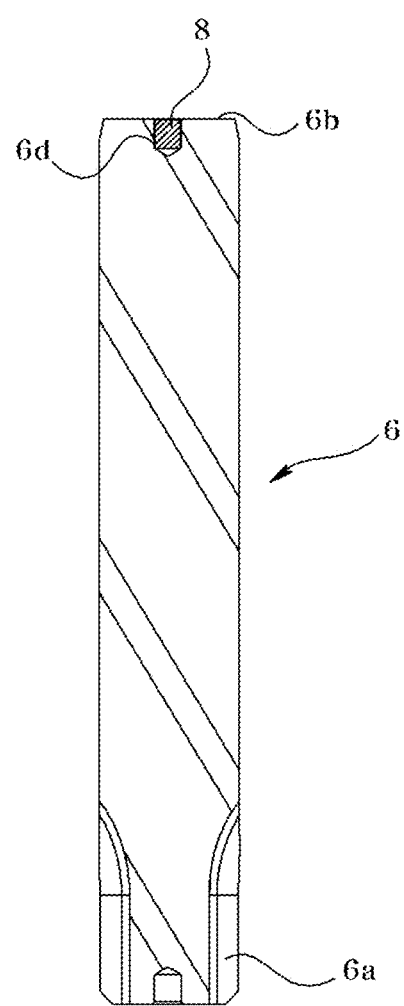
FIG. 4 is a cross-sectional view illustrating a rotation shaft and a sensing magnet according to another exemplary embodiment of the present disclosure.

FIG. 4 is a cross-sectional view illustrating a rotation shaft and a sensing magnet according to another exemplary embodiment of the present disclosure.

Referring to FIG. 4, a rotation shaft (6) becomes a rotation center of a rotor (10).

The rotation shaft (6) takes a shape of a cylinder, and is formed at a bottom periphery of the rotation shaft (6) with a set of teeth (6a) for transmitting a power.

The rotation shaft (6) is formed at an upper surface (6b) with an alignment groove (6d) concavely formed from the upper surface (6b). The alignment groove (6d) may take a shape of a circle, when viewed from a top plan.

A diameter of the alignment groove (6d) is formed smaller than a diameter of the rotation shaft (6), and the alignment groove (6d) may be formed higher than a height of a sensing magnet (8, described later), when measured from the upper surface (6b) of the rotation shaft (6). Furthermore the alignment groove (6d) may be formed with a same depth as that of the sensing magnet (8).

In the exemplary embodiment of the present disclosure, a center of alignment groove (6d) matches to a rotation center of the rotation shaft (6).

The sensing magnet (8) is installed inside the alignment groove (6d) formed on the upper surface (6b) of the rotation shaft (6). A shape of the sensing magnet (8) is formed to correspond to that of the alignment groove (6d) such that the sensing magnet (8) can be completely inserted into the alignment groove (6d), and the sensing magnet (8) may be inserted or press-fitted into the alignment groove (6d).

In the exemplary embodiment of the present disclosure, a height of the sensing magnet (8) is substantially same as a depth of the alignment groove (6d), and an upper surface of the sensing magnet (8) and the upper surface (6b) of the rotation shaft (6) are substantially arranged on a same planar surface.

The sensing magnet (8) inserted or press-fitted into the alignment groove (6d) generates a magnetic field for sensing the revolution of the rotation shaft (6). An area opposite to the sensing magnet (8) inserted or press-fitted into the alignment groove (6d) is arranged with a sensing plate detecting the magnetic field generated from the sensing magnet (8).

In the exemplary embodiment of the present disclosure, because the sensing magnet (8) is arranged inside the alignment groove (6d) arranged on the upper surface (6b) of the rotation shaft (6), an entire thickness of the motor (100) can be further reduced in comparison with a case where the sensing magnet (8) is protruded from the upper surface (6b) of the rotation shaft (6). Furthermore, size of the sensing magnet (8) can be reduced to decrease the manufacturing cost of the sensing magnet (8) forded with a high-priced rare earth, whereby productivity can be improved.

Meanwhile, an adhesive may be interposed between an inner surface of the rotation shaft (6) formed by the alignment groove (6d) and the sensing magnet (8) in order to prevent the sensing magnet (8) inserted or press-fitted into the alignment groove (6d) from being disengaged from the rotation shaft (6) when the rotation shaft (6) is rotated at a high speed.

In the exemplary embodiment of the present disclosure, the sensing magnet (8) can be coupled to the rotation shaft (6) without any separate jig, because the sensing magnet (8) is inserted or press-fitted into the alignment groove (6d) having a center that matches to a rotation center of the rotation shaft (6).

Hence, even a simple insertion or press-fitting of the sensing magnet (8) into the alignment groove (6d) of rotation shaft (6) can accurately match the rotation center of the sensing magnet (8) to the rotation center of the rotation shaft (6), whereby a sensing error of revolution of the rotation shaft (6) caused by an installation position of the sensing magnet (8) can be restricted or prevented.

The rotor (10) includes a core member (10a) coupled to a periphery of the rotation shaft (6) and a magnet (10b) press-fitted into the core member (10a). The rotor (10) is rotated by interaction with a stator (20, described later).

Referring to FIG. 1 again, the stator (20) is arranged about the rotor (10), and the stator (20) takes a shape wrapping the rotor (10).

The electromagnetic force generated from a coil (40) wound on the stator (20) interacts with the magnetic field generated from the magnet (10b) of the rotor (10) to generate a rotary power of the rotor (10).

The stator (20) is arranged an inner surface of a motor housing (5), and the stator (20) is arranged at a support unit formed at an inner circumferential surface of the motor housing (5).

The stator (20) may be formed by stacking a plurality of silicon steel plate sheets, each having a thickness of approximately 1 mm.

Each of the stacked silicon steel plate sheets forming the stator (20) takes a shape of a ring, when viewed from a top plan, and an inner circumferential surface of the ring-shaped silicon steel plate is formed with a plurality of core units (not shown) each protruded at an equal gap to a direction facing a center of the rotor (10). Furthermore, a distal end of each core unit is formed with a pole unit (not shown) extended to both sides of the core units. In the exemplary embodiment of the present disclosure, the number of core units may increase or decrease in response to size and output of the motor, and the core units may be formed with a multiple of three.

Meanwhile, the stator (20) includes an insulator (30) for electrical insulation from the coil (40).

As apparent from the foregoing, the motor according to the exemplary embodiment of the present disclosure has an industrial applicability in that it can accurately match a rotation center of a sensing magnet and a rotation center of a rotation shaft by arranging the sensing magnet arranged at a distal end of the rotation shaft for sensing a rotation speed of the rotation shaft, using an alignment groove formed at a distal end of the rotation shaft, to more accurately sense a revolution of the rotation shaft in response to the sensing magnet.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A motor with a shaft integrated sensing magnet, the motor comprising: a rotation shaft having an alignment groove at a distal end and a set of teeth at the other end thereof; a sensing magnet disposed at the distal end of the rotation shaft; a rotor including a magnet coupled to a periphery of the rotation shaft; and a stator including a core wrapping an ambient of the rotor and wound with a coil; wherein the alignment groove takes a shape of a circle when viewed from above and is concavely formed from an upper surface of the rotation shaft in a depth at least as great as a height of the sensing magnet; wherein the sensing magnet takes a shape corresponding to that of the alignment groove, and an entire outer lateral surface of the sensing magnet contacts an inner surface the alignment groove such that the sensing magnet is completely accommodated within the alignment groove; wherein a rotation center of the alignment groove matches a rotation center of the rotation shaft; wherein the sensing magnet is completely press-fitted into the alignment groove via an adhesive such that a rotation center of the sensing magnet matches the rotation center of the rotation shaft without a separate jig, wherein the sensing magnet is inhibited from being disengaged from the rotation shaft at a high speed; and wherein an upper surface of the sensing magnet is arranged on a same planar surface as that of the distal end of one side of the rotation shaft.

2. The motor of claim 1, wherein the sensing magnet takes a shape of a cylinder.

3. The motor of claim 1, wherein the adhesive is applied to a contacting area between the sensing magnet and the rotation shaft.

4. The motor of claim 1, wherein the depth of the alignment groove is less than 0.3 mm.

5. The motor of claim 1, wherein the set of teeth is formed at the periphery of the rotation shaft.

6. The motor of claim 1, wherein the stator includes an insulator for electrical insulation from the coil.

7. The motor of claim 1, wherein the rotor includes a core member coupled to the periphery of the rotation shaft.

8. The motor of claim 7, wherein the magnet of the rotor is press-fitted into the core member.

9. The motor of claim 1, wherein the stator is formed by stacking a plurality of silicon steel plate sheets.

10. The motor of claim 9, wherein each of the stacked silicon steel plate sheets takes a shape of a ring, when viewed from above.

\* \* \* \* \*